United States Patent [19]

Laude-Bousquet

[11] Patent Number: 4,814,189

[45] Date of Patent: Mar. 21, 1989

[54] PROCESS AND APPARATUS FOR THERMAL CONTROL OF WINEMAKING

[75] Inventor: Adrien Laude-Bousquet, Asne, France

[73] Assignee: Societe Thermique Generale Vinicole, Anse, France

[21] Appl. No.: 63,876

[22] Filed: Jun. 18, 1987

[30] Foreign Application Priority Data

Jun. 19, 1986 [FR] France ............... 86 09552

[51] Int. Cl.⁴ .............................................. C12G 1/00
[52] U.S. Cl. ...................................... 426/15; 99/276; 165/46
[58] Field of Search ............. 99/275, 276, 277, 277.1, 99/277.2, 278; 426/15; 165/46

[56] References Cited

U.S. PATENT DOCUMENTS 3,207,606  9/1965  Williams ............................ 99/276
3,830,676  8/1974  Elkins ................................ 165/46
4,494,451  1/1985  Hickey .............................. 99/276
4,552,060  11/1985 Simon ............................... 99/278

Primary Examiner—Robert W. Jenkins
Attorney, Agent, or Firm—Browdy and Neimark

[57] ABSTRACT

A process and apparatus are provided for controlling the temperature of various phases in the winemaking process by means of a heat-exchanging fluid circulating in at least one flexible exchanger, the thermoregulating action of which is exerted in a horizontal plane to favor stratification of the temperatures.

The apparatus comprises at least one removable heat exchanger consisting of a flexible or semirigid tubular structure made of a neutral material whose density is less than the density of the winemaking juice. The structure is placed in a horizontal plane in the winemaking vat.

16 Claims, 6 Drawing Sheets

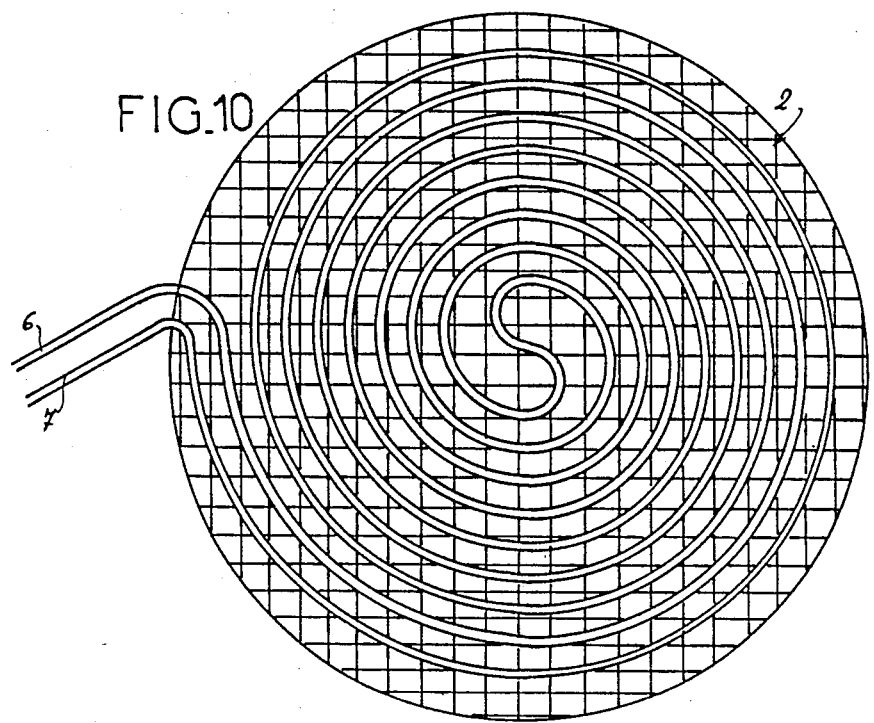

PROCESS AND APPARATUS FOR THERMAL CONTROL OF WINEMAKING

FIELD OF THE INVENTION

This invention relates to a process of thermal controlling of the winemaking process and the device for using of this process.

BACKGROUND OF THE INVENTION

It is known that the winemaking process involves two phases in the same vat: a must phase consisting of grape bunches or berries, and a juice phase, in which the fermentation phenomena occur, wherein an effort is made to control and to optimize the quantitative and especially qualitative yield of the resulting wine.

However, this optimization poses numerous problems because of the considerable differences existing between the preferred temperatures for each of these phases.

During the fermentation process of the must phase, the temperature can rise to 40°–45° C., and it would be advisable to maintain it at about 30°–35° C. to promote the finishing of the maturation and intracellular maceration and to extract the color better without risking stopping this fermentation because of too high a temperature. On the other hand, in the juice phase, a temperature on the order of 18° C. is the most favorable to assure the transformation of the sugar into alcohol and the development of aromas.

Further, it should be noted that the vintage temperature itself can vary greatly depending on whether it was performed in hot weather (risk of overheating of the bunches) or in cold weather (too slow starting of the fermentation) which at the start requires heating of the bunch-juice batch.

Various devices are now on the market for cooling and heating of musts and juices.

A device described in French Patent A-827 482 consists of a rigid coil placed in a stationary position on the inside of the vat about 0.15 meters above the marc layer, which limits its use to destemmed and treaded vintage.

This coil is integral with the vat and therefore cannot follow the progression of the marc cap, particularly in the case of winemaking of entire bunches.

Some devices perform the cooling or heating by pumping the juice in the lower part of the vat and making it pass into a stainless steel exchanger to send it back over the marc cap forming in the upper part of the vat.

However, these devices have certain drawbacks. Actually, putting the juice in motion by means of pumps, whose oenological qualities are often mediocre, often degrades the quality of the wine.

On the other hand, the phenomena of overheating or overcooling linked to anarchical deliveries or to clogging, which are often poorly controlled, are sources of risks.

In the case of stainless steel vats, cooling is often effected by running water around the vat.

However, it should be noted that, because of the large diameter of these vats, this process cannot assure a cooling of the core of the products that they contain.

Moreover, the strong aerations necessary to promote evaporation of the water are often not observed.

This process makes possible more of a maintenance of temperature than a real cooling; further, it acts on the entire batch of material contained in the vat, without it being possible to act selectively on the must phase or the juice phase.

Stainless steel vats surrounded by hot or ice water circulation devices are also used. The drawbacks of these devices are numerous: phenomena of overheating or overcooling on the exchange surface are noted; the large diameter of the vats do not make it possible to guarantee a real effectiveness in the vat unit.

Further, the temperature gradient promotes too much convection phenomena which are not desirable if it is desired to optimize the winemaking by means of stratification of temperatures.

Finally, according to some processes, exchangers generally called "flags," are immersed in the vat. These exchangers are immersed vertically in the vats and receive a circulation of heat-exchanging fluid which creates a convection movement.

The efficiency of these systems is very debatable because of the slightly thermal conductivity of the must phase, which is not very rich in juice.

On the other hand, handling of these expensive "flags" is difficult because of their weight, their bulk and their poor impact resistance.

Finally, and as in the processes mentioned above, they promote the convection phenomena to the detriment of the phenomena of stratification of temperatures.

SUMMARY OF THE INVENTION

The object of the present invention is to propose a process of thermal control of the winemaking process which remedies the above-mentioned drawbacks and makes it position to optimize easily and without costly investments the winemaking temperatures and particularly the temperatures of the must phase and juice phase, creating a phenomenon of stratification of these temperatures, which promotes particularly the formation of a natural piston system.

This process is characterized in that it consists in performing a controlled regulation of the temperatures of the various winemaking phases by means of heat-exchanging fluid circulating in at least a flexible exchanger whose heat-regulating action is exerted in a horizontal plane thus promoting a phenomenon of stratification of temperatures.

Advantageously, the heat-exchanging fluid circulates in at least two flexible exchangers located in the must phase and juice phase, and the temperature of said fluid is adapted to the requirements of the fermentation of each of said phases.

The apparatus for effecting the process according to the invention comprises at least one removable heat exchanger consisting of a flexible or semirigid structure, made of a neutral material whose density is less than the density of the winemaking juice, said structure being provided to be placed in a horizontal plane.

The heat exchanger according to the invention advantageously consists of a continuous tubular element configured in a spiral.

According to a particular embodiment of the invention, the spirals of the continuous tubular element are joined by a continuous layer of materials.

According to another embodiment of the invention, the spirals of the continuous tubular element are joined by bridges of materials placed in a discontinuous manner.

The dimensions of the heat exchanger are such that they occupy approximately all the surface of the vat.

The dimensions of the heat exchanger can also be less than the surface of the vat, and then provision is made to juxtapose several elements.

A net or wire mesh is advantageously provided to support the heat exchanger.

This invention will be understood and its advantages will come out from the following description with reference to the accompanying diagrammatic drawing.

DETAILED DESCRIPTION OF THE INVENTION

In the figures, the thermal control device according to the invention is designated generally by 2, the winemaking vat by 3, the juice phase by 4 and the must phase by 5.

The thermal control device or heat exchanger 2 according to the invention is made of flexible or semirigid synthetic material exhibiting an excellent mechanical strength between −10° C. and +80° C., a perfect inertness enabling it to remain insensitive to an extended stay in the must and in the juice, as well as alimentary qualities assuring a perfect neutrality preventing any transmission of taste. Further, according to the invention, the density of the constitutive material of the heat exchanger is less than the density of the winemaking juice, which will enable said exchanger to float on the juice as will be explained below. Alimentary polyethylene is particularly suitable for this purpose, as it is a reasonably priced material which can easily be shaped into the form desired for the exchanger according to the invention. Further, its strength enables it to support numerous handlings, at time even rough; the exchanger thus obtained is easy to handle, to wash with modern washing means: steam, for example.

Figure 3:
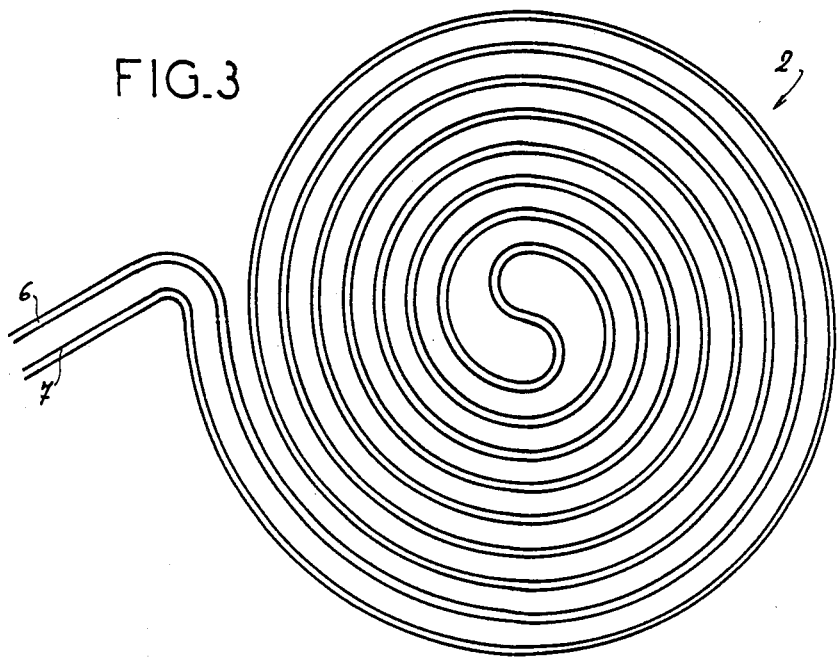
FIG. 3 is a top view of a first embodiment of the thermal control device according to the invention.

In the embodiment shown in FIG. 3, heat exchanger 2 is provided to occupy the entire surface of the vat and consists of a continuous tube 15/19 placed in a spiral with a spacing of about 15 centimeters between the coils in an approximately circular arrangement. The total length of the tube is about 50 meters and the exchange surface of said tube is about 3 m².

Figure 4:
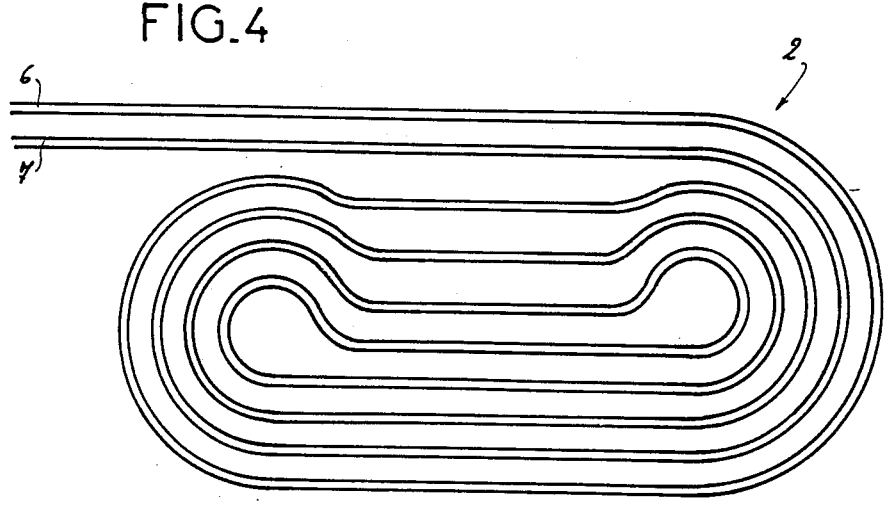
FIG. 4 is a top view of another embodiment of the thermal control device according to the invention.

In the embodiment represented in FIG. 4, heat exchanger 2 is provided to constitute a module juxtaposable with one or more other similar modules, particularly to facilitate handling of it; it consists of a continuous tube 15/19 placed in flattened spiral whose total length varies according to to the dimension of the module.

The continuous tube can also comprise molded bridges of material (not shown) giving the unit a certain strength.

A continuous layer of material can also join the spirals of the tube.

Intake and output pipes are provided during molding to extend the tubes in spirals.

Figure 5:
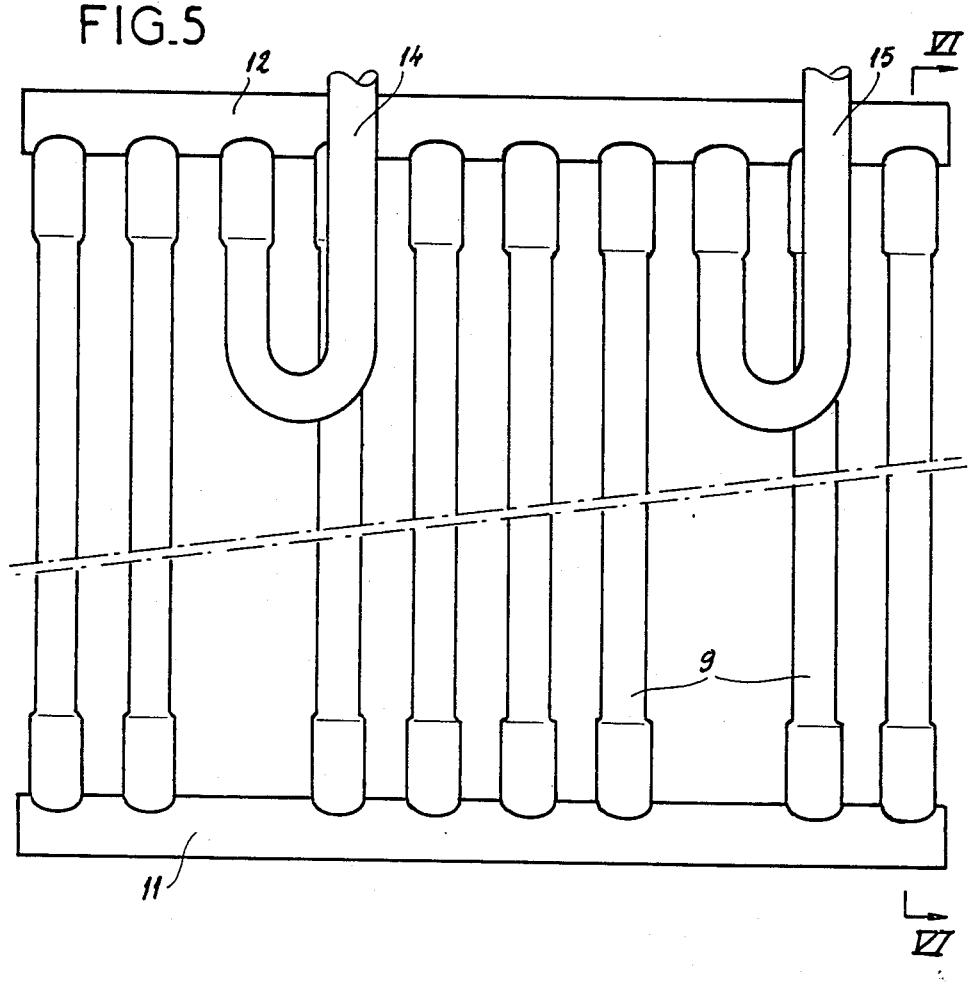
FIG. 5 represents a top view of another embodiment of the thermal control device according to the invention.
Figure 6:
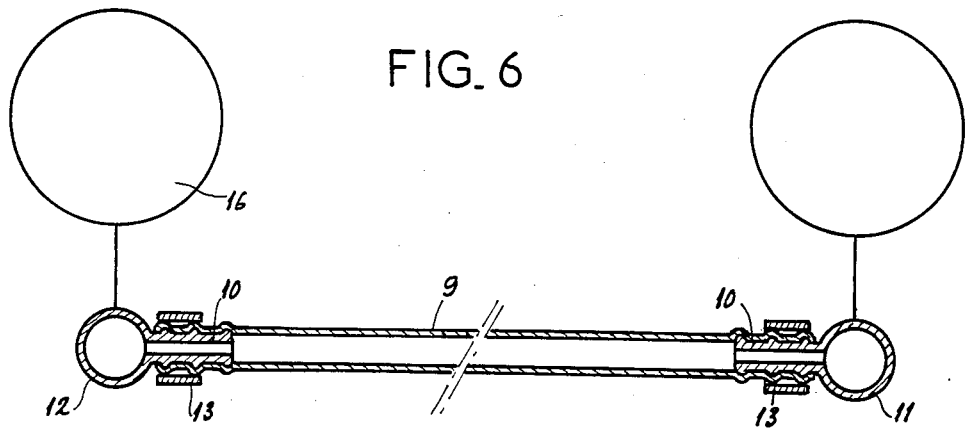
FIG. 6 is a view in section of the device of FIG. 5 modified by addition of a float.

Another embodiment of heat exchanger 2 is seen in FIGS. 5 and 6.

In this embodiment, a series of tubes 9 is connected to connectors 10 placed on two collectors 11 and 12 by means of stainless steel lug collars 13.

Heat-exchanging fluid intake and outlet pipes 14 and 15 are connected to at least one of collectors 11, 12.

Tubes 9 are made, as in the embodiment shown in FIGS. 1 to 4, of a flexible or semirigid neutral synthetic material whose density is less than that of the winemaking juice; alimentary polyethylene is particularly suitable for this purpose. Tubes 9 have a small diameter and slight thickness. It is easy to introduce this heat exchanger into the vat by a manhole; for this it suffices to introduce the collector by one end and to tighten the tubes on themselves and by bending them toward the other by the other end of the same collector.

This embodiment makes it possible to leave the tubes free, which makes them less vulnerable to possible fork blows during devatting.

Collectors 11 and 12 can be made of molded synthetic material, of less density than that of the winemaking juice; they can also be made of stainless steel. In the latter case, connectors 10 are welded to collectors 11, 12 and the collectors themselves are connected to one or more floats 16.

These floats can be provided to give exchanger 2 a permanent buoyance; they are then rigid.

If it is desired to give exchanger 2 a variable buoyancy, which optionally can be controlled; it is preferred to make these floats in the form of a flexible structure, for example from alimentary tanks that can be inflated or deflated at will.

The gas used to inflate these floats is selected from the inert gases. Nitrogen is well suited for this purpose, so that in case of a possible leak, the vintage and wine will not be altered or oxidized.

The presence of these flexible floats makes it possible to use exchanger 2 deliberately for all the processing sequences or ageing of the wine; in the heating phase they can be deflated and the exchanger placed in the "sunk to vat bottom" position and in the cooling phase their inflations will make it possible to place exchanger 2 in the "floating" position.

An example will be given below of the possibilities of placing of the floats—and therefore of the exchanger—during the various wine processing sequences:

1—Start of fermentation, "sunk to vat bottom": heating

2—Fermentation, "floating": cooling

3—Malolactic fermentations, "sunk to vat bottom": heating

4—Tartaric precipitations:

1st phase: "floating": cooling to about 0° C. depending on the alcohol degree.

2nd phase: "sunk to vat bottom": cooling because the density of the wine is then reversed.

3rd phase: put into variable floatability by successive inflation and deflation of the floats: creation of an agitation on the inside of the vat promoting the concentration of tartar crystals.

4th phase: "sunk to vat bottom": keeping the wine batch close to its freezing temperature during the entire storage as required for precipitation of tartaric acid.

5th phase: "sunk to vat bottom" to restore the wine temperature, recovery of the frigories and direct or indirect transmission into another exchanger placed in a second vat to be treated.

5—Aging of the wine, "sunk to the vat bottom": heating

6—Preservation, variable position depending on the outside temperature and the desired temperature.

Figure 1:
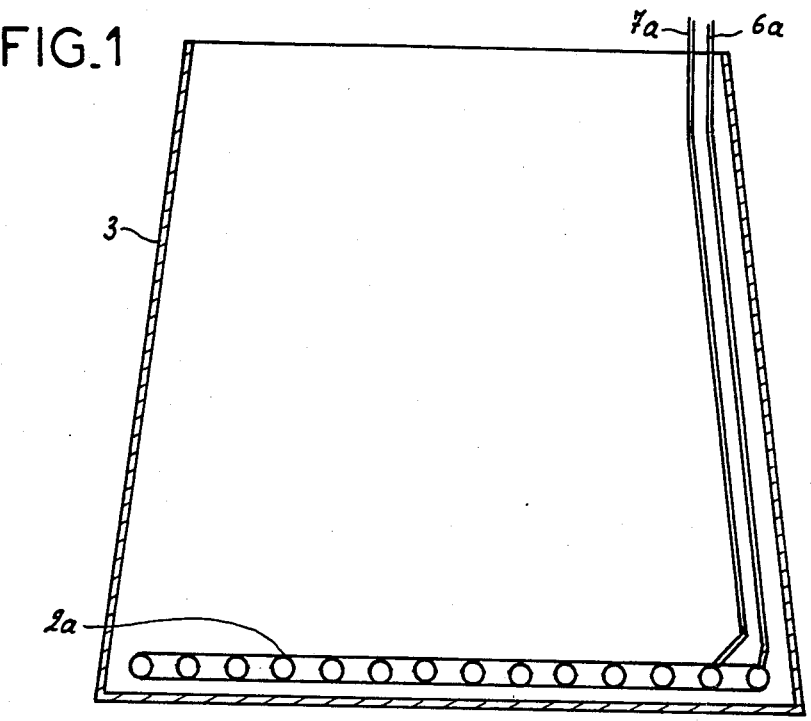
FIG. 1 is a view in very diagrammatic section of a vintage vat equipped in its lower part and before charging with a thermal control device according to the invention.

The placing and mode of operation of the heat exchangers according to the invention will now be described in greater detail with reference to FIGS. 1 and 2.

A first exchanger 2a is first placed at the bottom of vat 3 (FIG. 1); it can, of course, be a single exchanger of large dimensions or a set of exchangers of average dimensions. Feed pipes 6a, 7a are therefore connected to the heat-exchanging fluid network (not shown) on the outside of the vat.

Figure 2:
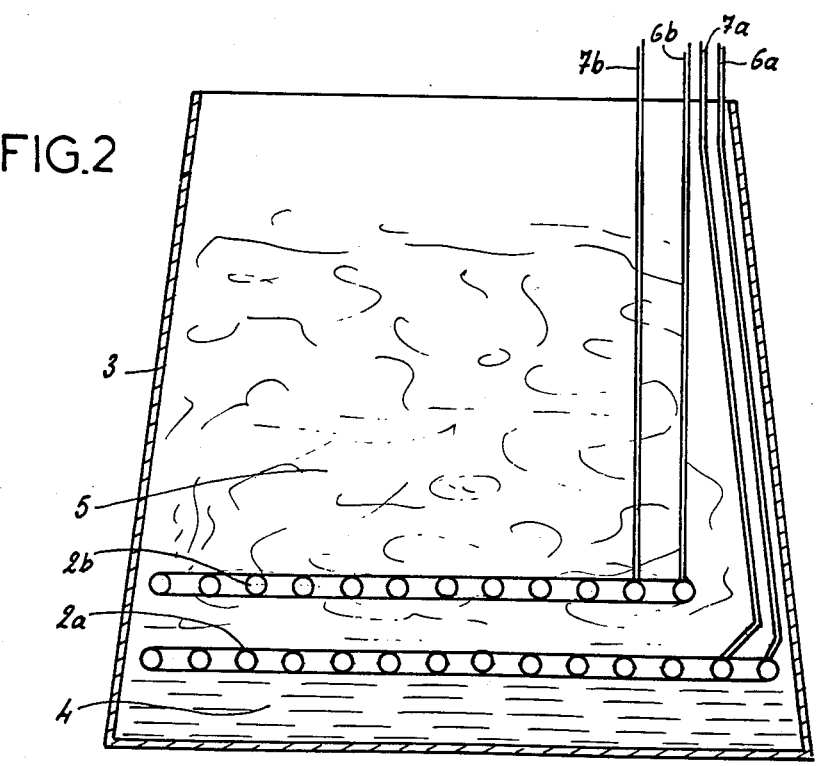
FIG. 2 is a view similar to FIG. 1, representing the full vat equipped with thermal control devices according to the invention.

When the vat has been filled ⅓ with grapes, a second exchanger 2b can be placed which will be in the heart of the berries-bunches, which will enable it to be kept at its temperature, and whose feed pipes 6b, 7b are also connected to the heat-exchanging fluid network (not shown) (FIG. 2).

In the case of "cold vintages," exchangers 2a, 2b are connected to the hot water circuit making it possible to bring the charge batch to around 25° C. to cause the start of fermentation.

Heat exchanger 2a is then connected to the ice water circuit to keep in the juice phase the optimal temperature of 18° C. promoting the transformation of the sugar into alcohol and the development of aromas.

Heat exchanger 2b can also be connected to the hot water circuit to keep the berry-bunch part at a temperature of about 30° to 35° C. to facilitate finishing of the maturation and intracellular maceration making possible a good color extraction without the need of pumping out the juice and re-pumping it in at the top. Any overheating phenomenon of the cap is very quickly controlled by a slight pumping over of juice as described above.

It is possible, especially in the case of a large-sized exchanger, to provide a support device (not shown) also made of a flexible alimentary material and, preferably, of a nature similar to that which serves for making the exchanger; it can be a net or wire mesh whose meshes are rather wide.

Before devatting, a pumping over of juice phase 4 will allow cooling of the batch to a temperature of the order of 18° C.

After this passage to the press, maintaining of the temperature will be done in another vat (not represented) thanks to a horizontal flexible exchanger 2, floating on the juice, fed ice water and adjusted to maintain a temperature of 18° C.

In the case of winemaking relating to only to juice, for example, making of white wine, flexible exchanger 2 will be in variable floatability. In the "sunk to vat bottom" position it will be used for heating, and in the floating position it will permit cooling.

The hot water and ice water generator can be a water-water heat pump, the condensation part serving to heat a hot water reserve and evaporation part to cool a tank of ice water.

Feeding of the vats by pipes distributing hot water and ice water, near the vats, is performed in a standard way by manual or electrically controlled valves, which allows a easy connection of exchangers 2.

Finally, regulation of the processes described above can be performed by automatic control, by self-regulated valve, or by any other means making it possible to regulate the delivery according to the temperature indicated in a way known in the art by probes placed in the center of vat and in the juice phase.

Figure 7:
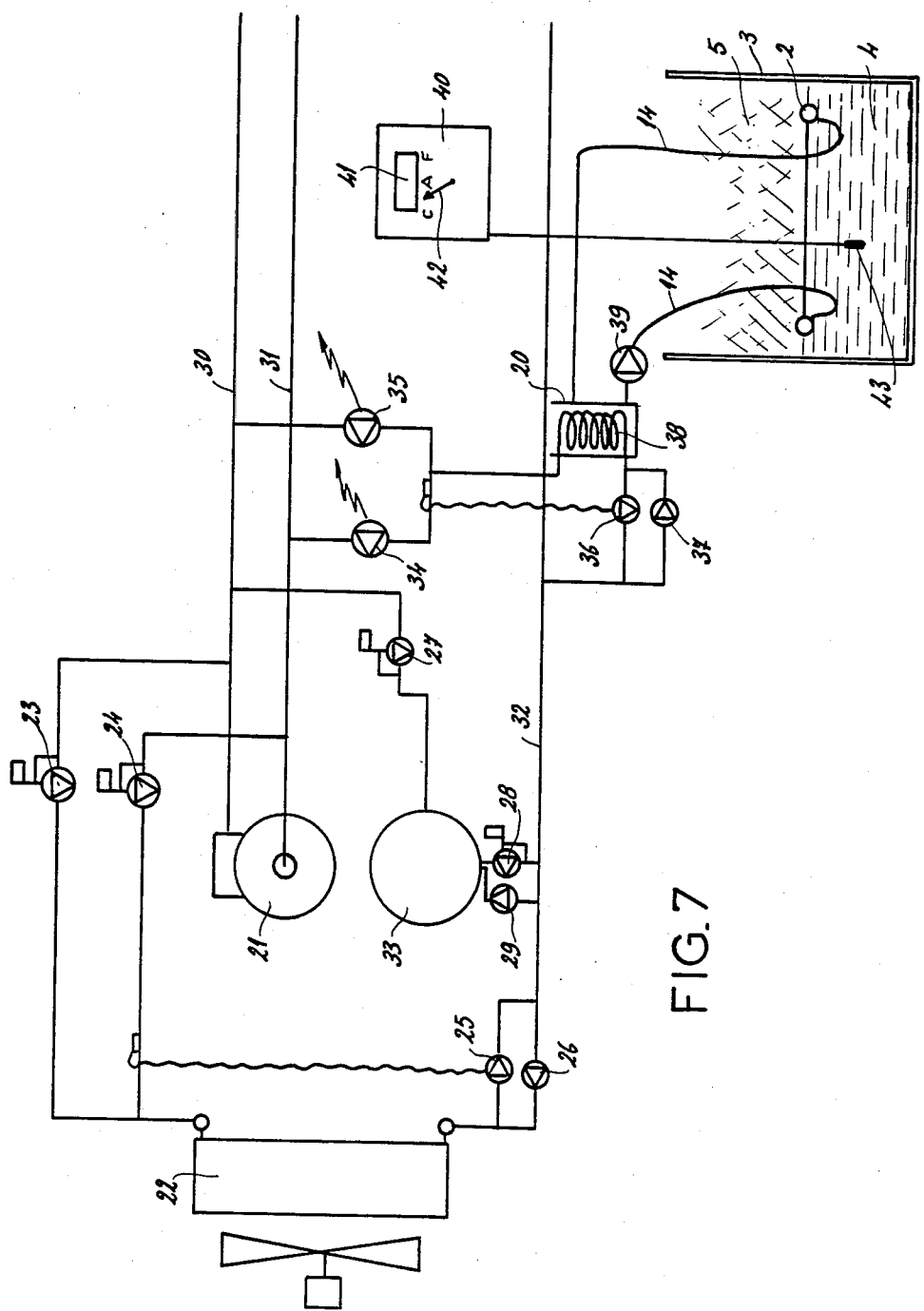
FIG. 7 represents a diagram of the thermodynamic installation with thermostatic control of the device according to the invention.
Figure 8:
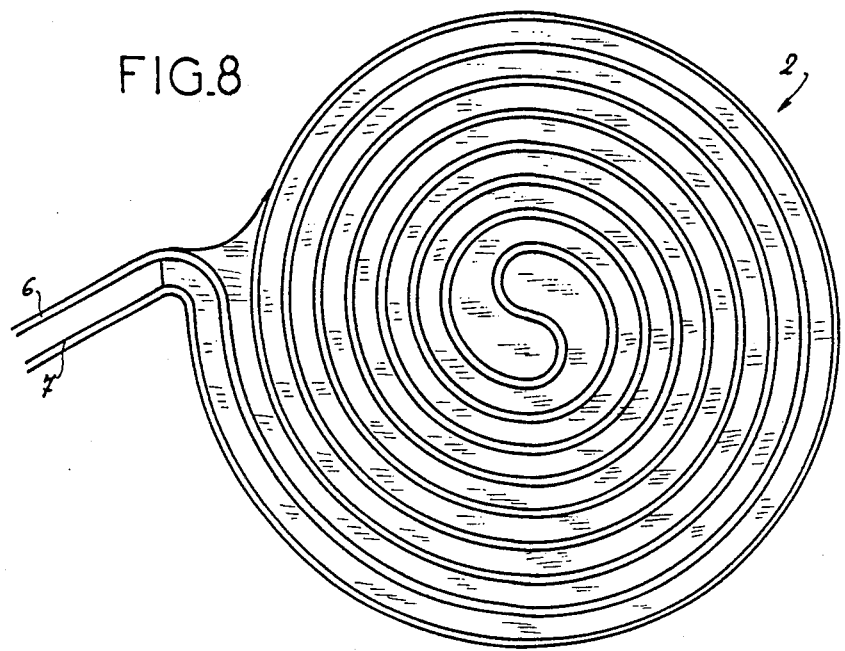
FIGS. 8-9 represent top views of other embodiments, FIG. 8 illustrating an embodiment wherein the spirals of the continuous tubular element are joined by a continuous layer of material, FIG. 9 showing an embodiment wherein the spirals of the continuous tubular element are joined by bridges of materials arranged in a discontinuous manner, and FIG. 10 showing an embodiment wherein a porous structure is provided to support the heat exchanger.
Figure 9:
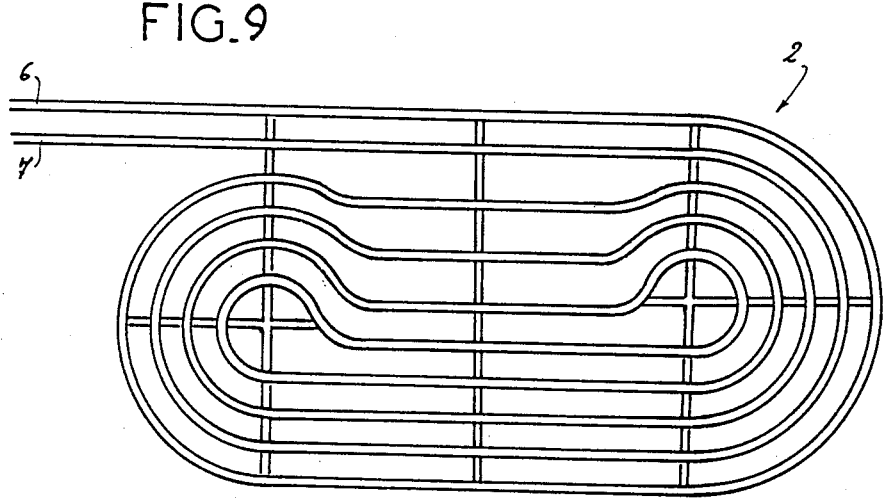

An example of an thermodynamic type installation assuring thermostatic control and supplying of calories or frigories will now be described in detail with reference to the diagram represented in FIG. 7.

A refrigerating machine compressor 21 is provided to adjust the produced thermal powers to the actual needs of the installation. It can be a single compressor, with variable speed or power, or several refrigerating machine compressors installed in parallel.

A condensor-evaporator 22, placed on the outside, is intended to assure the rejection of excess calories or, if necessary, to take from the outside the necessary calorific complement.

A high-pressure valve 23 controls the discharge pressure and constantly keeps it at a high level. If this pressure exceeds the regulating threshold, this valve 23 opens; thus compressed gases are released; they come to be condensed in condensor 22 and return, in liquid state, by line 32 by going through check valve 26.

A low-pressure modulating valve 24 is regulated by the suction pressure; if the suction pressure goes below the regulating threshold, this valve 24 opens, admitting gases coming from condensor-evaporator 22, itself fed by expanded gases coming from liquid line 32, by means of of a thermostatic expansion valve 25.

Further, a liquid storage tank 33 is provided which, depending on the operation conditions, is filled or emptied. A regulating valve 27, moreover, makes it possible to keep tank, 33 at a minimum pressure by intake of high-pressure gas above the liquid contained in said tank. A regulating valve 28 assures the discharge of liquid line 32 into tank 33 in case of a rise in pressure in this line 32. Finally, a check valve 29 sends liquid into line 32 in case the pressure in this line becomes less than that of tank 33 pressurized by valve 27.

The group of devices described above makes it possible have at all times, at each of the utilization stations, high-pressure- low-pressure gas or in the liquid state allowing the operation described further to be performed.

Further, at least one hot and cold water tankexchanger 20, in short circuit equipped with a coil 38, is connected, on the one hand, to the above group of devices and, on the other hand, to pipes 14 of exchanger 2.

At least one hot and cold tank-exchangers 20 can be provided, each being controlled from a regulating board 40 as described above. These tank-exchangers are provided to assure simultaneously the automatic thermostatic control of several exchangers 2 according to the winemaking needs, so that the exchanger or exchangers in the cooling phase can transfer their calories to the exchangers in the heating phase. Condensor-evaporator 22 can contribute the possible necessary thermal complement.

The regulating operations are controlled from regulating board 40 equipped with a regulator 41 optionally provided with a digital display thermostat. A switch 42 makes it possible to select three phases: heating (C), stop (A), cooling (F).

A probe 43, immersed in juice phase 4, assures the sensing of this temperature.

The regulating process will now be described.

In the heating phase, switch 42 is placed in heating position (C). If juice 4 is at a temperature below the desired temperature displayed on regulator 41, valve 35 opens and circulator 39 is started. The water contained in tank 20 is then heated due to the condensation of hot gases coming from line 30 and admitted into coil 38, these gases then returning, in the liquid state, over liquid line 32 by passing through check valve 37.

The hot water thus produced is carried into heat exchanger 2 by means of circulator 39 and connecting hoses 14.

If, now, it is desired to cause a cooling phase, switch 42 is placed in cooling position (F). If the desired temperature, at the level of thermostat-regulator disllay 42, is greater than the temperature communicated by probe 43, valve 34 opens and circulator 39 is started.

The water contained in tank-exchanger 20 is then cooled because of the evaporation of the liquid, which is introduced by thermostat reducer valve 36. The opening of valve 34 then allows the gases to rejoin suction line 31. Circulator 39 thus carries the water thus cooled into heat exchanger 2 by means of connecting hoses 14.

The above description makes it possible to show an extremely important advantage of the device according to the invention in relation to standard cooling and heating installations by bringing into play large volumes of heat-exchanging liquid. Actually, the slight amount of water contained in tank-exchanger 20 makes possible a fast passage from hot to cold and excludes any risk of pollution of the vintage in case of accidental rupture of the network.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. A process for thermally controlling the winemaking process in a vat containing juice to be fermented by regulating the temperatures of each winemaking phase comprising:
   introducing into the vat at least one flexible exchanger;
   regulating the temperatures of the phases of the winemaking process by means of a horizontally-placed heat-exchanging fluid circulating in the at lest one flexible exchanger to promote stratification of temperatures;
   said flexible exchanger being independent of the vat and exhibiting a density less than the density of the winemaking juice.

2. The process of claim 1 wherein the heat-exchanging fluid circulates in at least two flexible exchangers; one exchanger located in the must phase of the vat; one exchanger located in the juice phase of the vat; wherein the temperature of the fluid is controlled according to the requirements of the fermentation of each of said phases.

3. Apparatus for thermally controlling the winemaking process in a fermentation vat comprising:
   at least one removable heat exchanger;
   said heat exchanger consisting of a flexible or semi-rigid tubular structure made of a neutral material having a density less than the density of the winemaking juice;
   said apparatus placed in the horizontal plane in the vat.

4. The apparatus of claim 3, wherein the heat exchanger comprises a continuous tubular element placed in a spiral.

5. The apparatus of claim 4 wherein the spirals of the continuous tubular element are joined by a continuous layer of material.

6. The apparatus of claim 4 wherein the spirals of the continuous tubular element are joined by bridges of material arranged in a discontinuous manner.

7. The apparatus of claim 3 wherein a heat exchanger comprises a set of pipes joined to collectors.

8. The apparatus of claim 3 wherein a floating structure is associated with the heat exchanger.

9. The apparatus of claim 3 wherein the dimensions of the heat exchanger are such that the heat exchanger occupies approximately the entire surface of the vat.

10. The, apparatus of claim 3 wherein the dimensions of the heat exchanger are less than those of the surface of the vat and several elements are juxtaposed therein.

11. The apparatus of claim 3 wherein a porous structure is provided to support the heat exchanger.

12. The apparatus of claim 3 wherein the apparatus is connected to a thermodynamic installation with automatic thermostatic control.

13. The apparatus of claim 12, wherein the thermodynamic installation with automatic thermostatic control is connected to at least one hot and cold water tank-exchanger in short circuit.

14. The apparatus of claim 12, wherein several tanks-exchangers are provided to assure simultaneously the automatic thermostatic control of several exchangers according to the winemaking needs, so that the exchanger or exchangers in the cooling phase can transfer their calories to exchangers in the heating phase.

15. The apparatus of claim 12 wherein the thermodynamic installation with thermostatic control is connected to a condenser-evaporator.

16. Apparatus for thermally controlling the winemaking process in a vat containing juice to be fermented by regulating the temperatures of each winemaking phase comprising:
   heat exchanger means comprising at lest one flexible exchanger in the vat;
   means for regulating the temperatures of the phases of the winemaking process by means of a horizontally-placed heat-exchanging fluid for circulating in the at least one flexible exchanger to promote stratification of temperatures;
   said flexible exchanger being independent of the vat and exhibiting a density less than the density of the winemaking juice.

* * * * *